US008648984B2

(12) United States Patent
Kim et al.

(10) Patent No.: US 8,648,984 B2
(45) Date of Patent: Feb. 11, 2014

(54) COLOR FILTER SUBSTRATE HAVING BALL SPACERS DISPOSED WITHIN BLACK MATRIXES FOR LIQUID CRYSTAL DISPLAY DEVICE AND METHOD FOR FABRICATING THE SAME

(75) Inventors: Bong Chul Kim, Daegu (KR); Jun Beom Cho, Gyeonggi-do (KR); Seung Hyung Lee, Gyeonggi-do (KR); Kyo Yong Koo, Gyeongsangbuk-do (KR); Hyeon Jin Seo, Gyeongsanbuk-do (KR); Dhang Kwon, Daejeon (KR); Robert Taff, Pleasanton, CA (US)

(73) Assignee: LG Display Co., Ltd., Seoul (KR)

( * ) Notice: Subject to any disclaimer, the term of this patent is extended or adjusted under 35 U.S.C. 154(b) by 404 days.

(21) Appl. No.: 11/647,374

(22) Filed: Dec. 29, 2006

(65) Prior Publication Data

US 2007/0291385 A1   Dec. 20, 2007

(30) Foreign Application Priority Data

Jun. 20, 2006 (KR) ........................ 10-2006-0055577

(51) Int. Cl.
*G02F 1/1333* (2006.01)
*G02F 1/1335* (2006.01)
*G02F 1/1339* (2006.01)
*G02F 1/13* (2006.01)

(52) U.S. Cl.
USPC ........... 349/110; 349/106; 349/107; 349/138; 349/155; 349/157; 349/187

(58) Field of Classification Search
USPC ......... 349/106–110, 155–157, 122, 123, 138, 349/187
See application file for complete search history.

(56) References Cited

U.S. PATENT DOCUMENTS

| 4,678,282 | A | * | 7/1987 | Yaniv et al. ...................... 349/42 |
| 5,338,240 | A | * | 8/1994 | Kim ................................ 445/24 |
| 5,626,796 | A | * | 5/1997 | Tsujimura et al. ............ 349/106 |
| 5,739,880 | A | * | 4/1998 | Suzuki et al. ................. 349/110 |
| 5,929,960 | A | * | 7/1999 | West et al. ..................... 349/156 |
| 6,162,654 | A | * | 12/2000 | Kawabe .......................... 438/30 |
| 6,208,394 | B1 | * | 3/2001 | Tanaka et al. ................. 349/106 |
| 6,281,960 | B1 | * | 8/2001 | Kishimoto et al. ........... 349/156 |
| 7,248,312 | B2 | * | 7/2007 | Jun et al. ....................... 349/106 |
| 8,040,484 | B2 | * | 10/2011 | Kim .............................. 349/155 |
| 2005/0122446 | A1 | * | 6/2005 | Jeon .............................. 349/110 |
| 2005/0264723 | A1 | * | 12/2005 | Lee ............................... 349/110 |
| 2006/0274220 | A1 | * | 12/2006 | Kim ............................... 349/56 |
| 2006/0279688 | A1 | * | 12/2006 | Wu et al. ...................... 349/155 |
| 2007/0019148 | A1 | * | 1/2007 | Ueda ............................ 349/155 |

FOREIGN PATENT DOCUMENTS

| JP | 11-38420 | | 2/1999 | |
| JP | 11038420 | A * | 2/1999 | .......... G02F 1/1339 |
| JP | 11-142861 | | 5/1999 | |
| JP | 2000-75281 | | 3/2000 | |
| JP | 2001-33817 | | 2/2001 | |
| JP | 2001-59055 | | 3/2001 | |

* cited by examiner

*Primary Examiner* — Lucy Chien
*Assistant Examiner* — Paisley L Arendt
(74) *Attorney, Agent, or Firm* — Morgan, Lewis & Bockius LLP

(57) ABSTRACT

A color filter substrate for a liquid crystal display device and a method of fabricating the same includes black matrixes on a transparent insulating substrate, the black matrixes defining pixel areas and having a first region and a second region, color filters in the pixel areas and having areas overlapping the first region of the black matrixes, and ball spacers above the second region of the black matrixes, wherein a thickness of the first region is greater than a thickness of the second region.

20 Claims, 3 Drawing Sheets

COLOR FILTER SUBSTRATE HAVING BALL SPACERS DISPOSED WITHIN BLACK MATRIXES FOR LIQUID CRYSTAL DISPLAY DEVICE AND METHOD FOR FABRICATING THE SAME

The invention claims the benefit of Korean Patent Application No. 2006-0055577 filed in Korea on Jun. 20, 2006, which is hereby incorporated by reference in its entirety.

BACKGROUND OF THE INVENTION

1. Field of the Invention

Embodiments of the invention relates to a liquid crystal display device, and more particularly, to a color filter substrate for a liquid crystal display device and a method of fabricating the same. Although embodiments of the invention are suitable for a wide scope of applications, they are particularly suitable for obtaining a color filter substrate for a liquid crystal display device and a method of fabricating the same that prevent a gravity defect and a touch defect.

2. Discussion of the Related Art

The role of electronic display has become more important in the current information oriented society. Electronic displays have been widely used in various industrial fields. In addition, electronic displays have been rapidly advanced to provide functions meeting to the demands of the information oriented society.

In general, an electronic display is a device that transfers various information to humans through visual sense. The electronic display transforms electronic information signals outputted from various electric devices into optical information signals that can be recognized by the human eyes. An electronic display may be considered as a bridging device for connecting humans to the electronic devices.

The electronic display is classified into an emissive display if it displays the optical information signal through emitting light, and a non-emissive display if it displays the optical information signal through optical modulation using reflection, diffusion, and interference characteristics. Examples of emissive displays, which also may be referred to as active displays, include a cathode ray tube ("CRT"), a plasma display panel ("PDP"), an organic electroluminescent display ("OELD"), and a light emitting diode ("LED"). Examples of non-emissive displays, which also may be referred to as passive displays, include a liquid crystal display ("LCD"), and an electrophoretic image display ("EPID").

Electronic displays have been applied to computer monitors and televisions. The cathode ray tube ("CRT"), which is the display having the longest history, has a large market share in terms of economic efficiency, but has many disadvantages, including heavy weight, large volume, and high power consumption.

In light of the rapid development of semiconductor technology, various electronic devices have become small, thin and light weighted, and a flat panel display device has been receiving attention as an electronic display proper to such a trend in the electronic devices. Accordingly, the demand of flat panel display devices has rapidly increased. In order to satisfy such a demand, flat panel display devices such as a liquid crystal display ("LCD") device, a PDP device, and an OELD device have been intensively researched. Among the flat panel devices, a liquid crystal display device has been receiving attention due to the advantages thereof, such as, small, light-weight and thin, low power consumption and low driving voltage.

In general, a liquid crystal display devices includes a color filter substrate having a color filter and a black matrix, and an array substrate having a thin film transistor ("TFT") element and pixel electrodes. The liquid crystal display device also includes a liquid crystal material having anisotropic dielectric property interposed between the color filter substrate and the array substrate. The liquid crystal display device displays a desired image by controlling the amount of light transmitting through the color filter substrate and the array substrate by applying electric potential to the pixel electrodes and a common electrode, to thereby change the arrangement of liquid crystal molecules.

A liquid crystal display device needs to maintain a cell gap between the color filter substrate and the array substrate, and spacers have been introduced to maintain a constant cell gap in the liquid crystal display device. Spacers can be classified into a ball spacer disposed on the substrate or a column spacer formed on the substrate after patterned to have a predetermined shape Ball spacers have a thermal expansion coefficient similar to that of the liquid crystal material. Accordingly, the ball spacers can be used at any temperature conditions.

However, the ball spacers may be shifted when a liquid crystal display device is vibrated or undergoes impacts. When the liquid crystal display device according the related art is vibrated or undergoes impacts, the arrangement of the liquid crystal molecules changes or becomes tilted, thereby causing light leakage defect and reducing a contrast ratio of the liquid crystal display device.

To overcome such a problem, a liquid crystal display device according to the related art includes a patterned column spacer instead of ball spacers. The pattern column spacer is formed on the substrate to suppress diffusion problem or the light leakage problem. However, such a liquid crystal display device having the column spacer according to the related art may have a gravity defect. A gravity defect occurs when the liquid crystal molecules leans toward the gravity direction in the high temperature. In addition, such a liquid crystal display device having the column spacer according to related art may have a touch defect when pressure is applied to the liquid crystal display device.

SUMMARY OF THE INVENTION

Accordingly, embodiments of the invention is directed to a color filter substrate for a liquid crystal display device and a method of fabricating the same that substantially obviate one or more of the problems due to limitations and disadvantages of the related art.

An object of embodiments of the invention is to provide a color filter substrate for a liquid crystal display device and a method of fabricating the same that prevent a gravity defect and a touch defect and a method of fabricating the same.

Another object of embodiments of the invention is to provide a color filter substrate for a liquid crystal display device and a method of fabricating the same that improve a contrast ratio of a liquid crystal display device by suppressing light leakage defect caused by spacer movement.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a color filter substrate for a liquid crystal display device includes black matrixes on a transparent insulating substrate, the black matrixes defining pixel areas and having a first region and a second region, color filters in the pixel areas and having areas overlapping the first region of the black matrixes, and ball spacers above the second region of the black matrixes, wherein a thickness of the first region is greater than a thickness of the second region.

In another aspect, a method for fabricating a color filter substrate for a liquid crystal display device includes forming black matrixes on a transparent insulating substrate, the black matrixes defining pixel areas and having a first region and a second region, forming color filters in the pixel areas and having areas overlapping the first region of the black matrixes, and forming ball spacers above the second region of the black matrixes, wherein a thickness of the first region is greater than a thickness of the second region.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

DETAILED DESCRIPTION OF THE PREFERRED EMBODIMENTS

Reference will now be made in detail to the preferred embodiments of the invention, examples of which are illustrated in the accompanying drawings.

Figure 1:
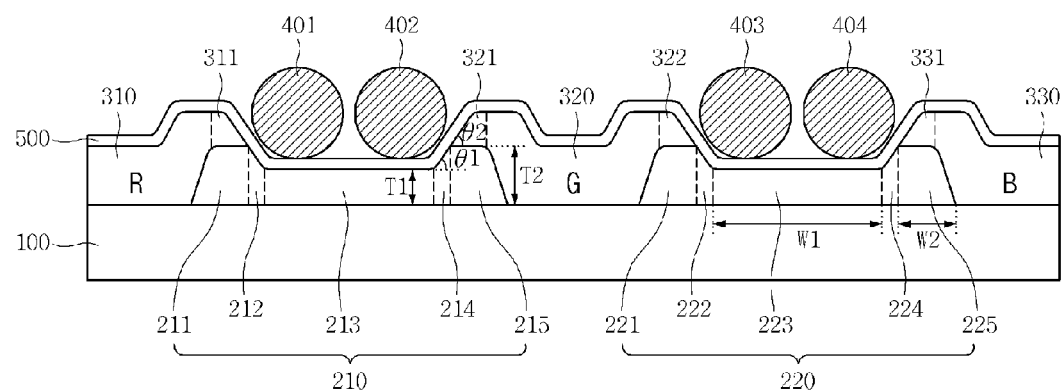
FIG. 1 is a cross-sectional view illustrating a color filter substrate of a liquid crystal display device in accordance with an exemplary embodiment of the invention.

FIG. 1 is a cross-sectional view illustrating a color filter substrate of a liquid crystal display device in accordance with an exemplary embodiment of the invention. In FIG. 1, a color filter includes a transparent insulating substrate 100, black matrixes 210 and 220, color filters 310, 320 and 330, a passivation layer 500, and ball spacers 401 to 404. The black matrixes 210 and 220 are formed on the substrate 100 and define a pixel area. The transparent insulating substrate 100 may be formed of glass, and the black matrixes 210 and 220 may be formed of chrome (Cr), chrome oxide layer ($Cr_2O_3$), a black resin or a material that absorbs light.

In addition, the color filter 301 is a red color filter realizing red color and corresponding to a red (R) pixel, the color filter 320 is a green color filter realizing green color and corresponding to a green (G) pixel, and the color filter 330 is a blue color filter realizing blue color and corresponding to a blue (B) pixel. The red, green and blue color filters 310, 320 and 330 are formed in the pixel area defined by the black matrixes 210 and 220 and have predetermined portions overlapping the black matrixes 210 and 220. Further, the red, green, and blue color filters 310, 320 and 330 may be alternatively formed in the pixel area defined by the black matrixes 210 and 220.

The passivation layer 500 is formed on the black matrixes 210 and 220 and the color filter 310, 320 and 330, and prevents pigment ions from being erupted. The passivation layer 500 can be formed of material having insulating property. For example, the passivation layer 500 can be formed of polyimide. In addition, the ball spacers 401, 402, 403 and 404 are disposed above the black matrixes 210 and 220. In particular, the ball spacers 401, 402, 403 and 404 are disposed above spacer disposed regions 213 and 223 of the black matrixes 210 and 220.

The black matrixes 210 and 220 include color filter overlapping regions 211, 215, 221, and 225, which overlap the color filters 310, 320 and 330. The color filter overlapping regions 211, 215, 221 and 225 have a thickness T2 thicker than a thickness T1 of the spacer disposed regions 213 and 223. In addition, the color filter overlapping regions 211, 215, 221, and 225 of the black matrixes 210 and 220 can be formed to have the thickness T2 about 1.5 to 4 times thicker than that of the spacer disposed regions 213 and 223 of the black matrixes 210 and 220. For example, if the spacer disposed regions 213 and 223 of the black matrixes 210 and 220 are formed at about 1 μm of thickness, the color filter overlapping areas 211, 215, 221 and 225 can be formed at about 1.5 to 4 μm of thickness.

Accordingly, the ball spacers 401, 402, 403 and 404 are prevented from being shifted outwardly from the black matrixes 210 and 220 even when the liquid crystal display device is vibrated or undergoes certain impact. Therefore, light leakage defect caused by a tilted liquid crystal arrangement can be effectively suppressed. In addition, since an overcoat layer is not required to flatten the upper portion of the black matrixes 210 and 220, and the color filters 310, 320 and 330, the fabricating process can be effectively simplified.

The ball spacers 401, 402, 403 and 404 can be balls having superior resilience property. When using plastic balls as the ball spacers 401, 402, 403 and 404, touch defect can be effectively suppressed because the diameter of the plastic ball can vary, thereby accommodating a touch pressure applied to the liquid crystal display. In addition, a plastic ball spacer has a thermal expansion coefficient similar to that of the liquid crystal. As a result, although the transparent insulating substrate 100 is expanded in a high temperature environment, the plastic ball spacers expand together with the transparent insulating substrate 100, thereby constantly sustaining a cell gap in a liquid crystal display device. Therefore, gravity defect caused by liquid crystals leaning toward the gravity direction also can be effectively suppressed.

The black matrixes 210 and 220 may have boundary regions 212, 214, 222 and 224 between the color filter overlapping regions 211, 215, 221 and 225, and the spacer disposed regions 213 and 223, and the boundary regions 212, 214, 222 and 224 may have an upper surface inclined at a first angle θ1. The first angle θ1 of the boundary areas 212, 214, 222 and 224 can be about 20° to 160° with respect to the main surface of the substrate 100.

In addition, the color filters 310, 320 and 330 may have boundary regions 311, 321, 322, and 331 above the color filter overlapping regions 211, 215, 221 and 225 of the black matrixes 210 and 220, and the boundary regions 311, 321, 322 and 331 may have an upper surface inclined at a second angle θ2. The second angle θ2 of the boundary areas 311, 321, 322, and 331 of the color filters 310, 320 and 330 can be about 20° to 160° with respect to the main surface of the substrate 100. Accordingly, the accuracy of disposing the ball spacers 401, 402, 403 and 404 can be effectively improved when spacer ink droplets mixed with the ball spacers 401, 402, 403 and 404 are injected in an inkjet process.

Further, a width W2 of each of the color filter overlapping regions 211, 215, 221 and 225 of the black matrixes 210 and 220 can be formed to be about 2/30 to 6/30 of a width W1 of each of the spacer disposed regions 213 and 223. For example, if the width W1 of the spacer disposed regions 213 and 223 is about 30 μm, the width W2 of the color filter overlapping regions 211, 215, 221 and 225 is about 2 to 6 μm. Therefore, the fabricating process margin of the color filters 310, 320 and 330 can be secured without reducing an opening ratio.

Thus, a color substrate for a liquid crystal display device according to an embodiment of the invention improves the accuracy of disposing the ball spacers and prevents the ball spacers from being shifted. In addition, a color substrate according to an embodiment of the invention suppresses the gravity defect, touch defect, and light leakage defect effectively by using plastic ball spacers.

Figure 2A:
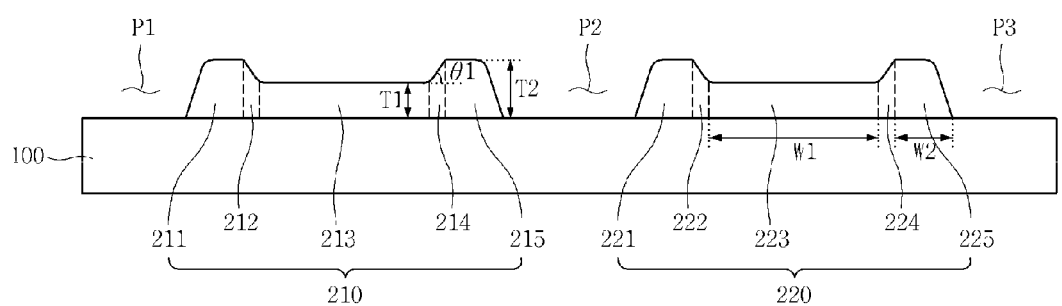
FIGS. 2A to 2E are cross-sectional views illustrating a method for fabricating a color filter substrate of a liquid crystal display device in accordance with an exemplary embodiment of the invention.

FIGS. 2A to 2E are cross-sectional views illustrating a method for fabricating a color filter substrate of a liquid crystal display device in accordance with an exemplary embodiment of the invention. As shown in FIG. 2A, black matrixes 210 and 220 are formed on a transparent insulating substrate 100. The transparent insulating substrate 100 may be formed of glass, and the black matrixes 210 and 220 define pixel areas P1 to P3. The black matrixes 210 and 220 can be formed by depositing chrome (Cr) or chrome oxide layer ($Cr_2O_3$). Alternatively, the black matrixes 210 and 220 can be formed by coating black resin that absorbs light.

In addition, the black matrixes 210 and 220 are formed to have color filter overlapping regions 211, 215, 221, and 225 having a thickness T2, and spacer disposed regions 213 and 223 having a thickness T1. In addition, the color filter overlapping regions 211, 215, 221, and 225 can be formed to have the thickness T2 about 1.5 to 4 times thicker than that of the spacer disposed regions 213 and 223. For example, if the thickness T1 of the spacer disposed regions 213 and 223 is about 1 μm, the thickness T2 of the color filter overlapping regions 211, 215, 221 and 225 can be formed to be about 1.5 to 4 μm.

In addition, the black matrixes 210 and 220 are formed to have boundary regions 212, 214, 222 and 224 between the color filter overlapping regions 211, 215, 221 and 225 and the spacer disposed regions 213 and 223. The boundary regions 212, 214, 222 and 224 are formed to be tilted at a first angle θ1 between the color filter overlapping areas 211, 215, 221 and 225, and the ball spacer disposed areas 213 and 223. For example, the first angle θ1 of the boundary areas 212, 214, 222 and 224 can be about 20° to 160° with respect to a main surface of the substrate 100. Although not shown, the black matrixes 210 and 220 can be effectively formed by a photolithography process using a halftone mask or a diffusion mask.

Figure 2B:
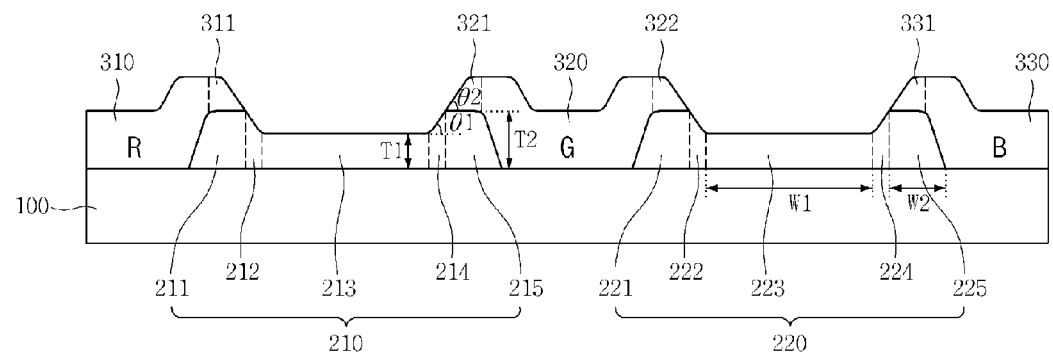

As shown in FIG. 2B, color filters including a red color filter 310 formed of red pixels for expressing red color, a green color filter 320 formed of green pixels for expressing green color and a blue color filter 330 formed of blue pixels for expressing blue color are formed at the pixel areas P1 to P3. The color filters 310, 320 and 330 have predetermined regions overlapping the black matrixes 210 and 220. In particular, the color filters 310, 320 and 330 overlap the black matrixes 210 and 220 at the color filter overlapping regions 211, 215, 221 and 225 of the black matrixes 210 and 220.

In addition, the red color filter 310, the green color filter 320, and the blue color filter 330 are alternatively formed at the pixel areas P1 to P3, which are defined by the black matrixes 210 and 220. The color filters 310, 320 and 330 have boundary regions 311, 321, 322 and 331 formed to be tilted at a second angle θ2 over the color filter overlapping regions 211, 215, 221 and 225 of the black matrixes 210 and 220. For example, the second angle θ2 of the boundary regions 311, 321, 322, and 331 of the color filters 310, 320 and 330 can be about 20° to 160° with respect to the main surface of the substrate 100.

Figure 2C:
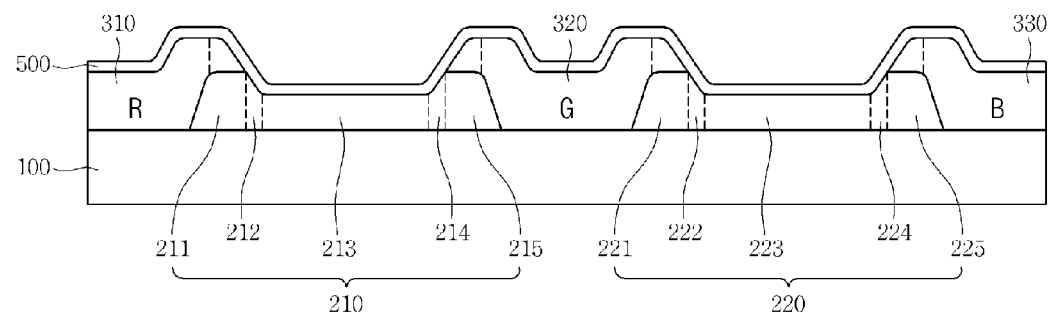

As shown in FIG. 2C, a passivation layer 500 is formed on the color filters 310, 320 and 330 and the black matrixes 210 and 220. The passivation layer 500 can be formed of material having an insulating property, for example, polyimide.

Figure 2D:
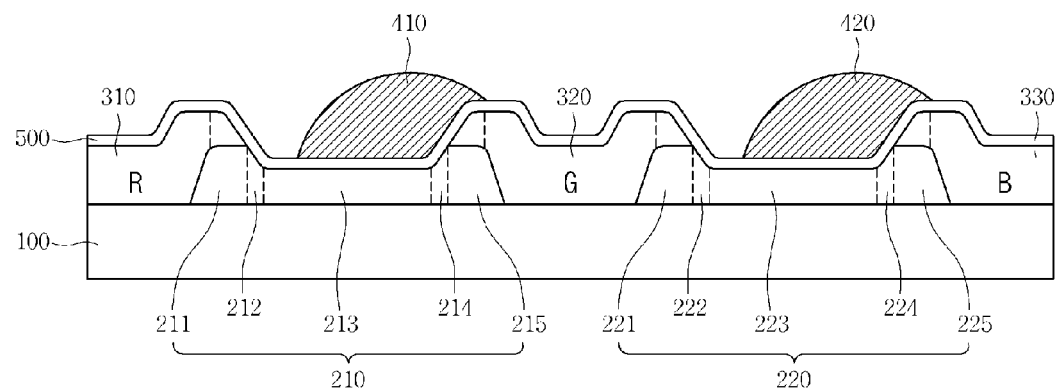

As shown in FIG. 2D, spacer ink droplets 410 and 420 are injected onto the black matrixes 210 and 220. The spacer ink droplets 410 and 420 may be injected by using an inkjet process, and although not specifically shown, the spacer ink droplets 410 and 420 are mixed with ball spacers 401, 402, 403 and 404. In addition, the ball spacers 401, 402, 403 and 404 may be formed of plastic ball spacers having superior elastic resilience property.

Figure 2E:
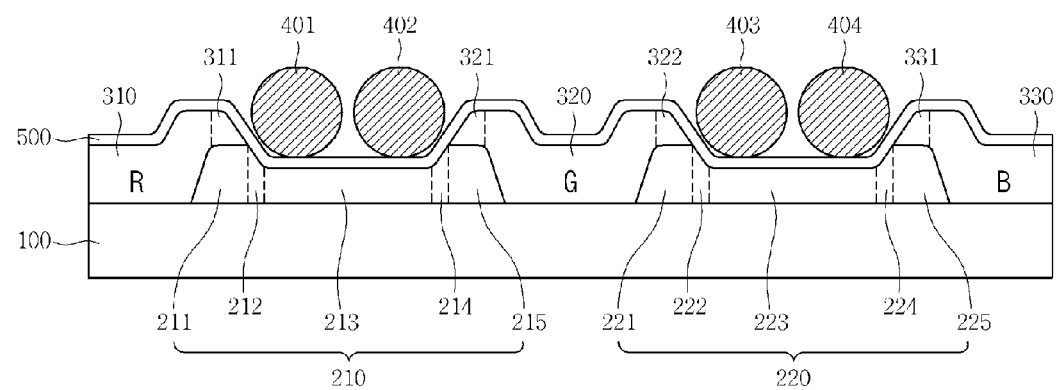

As shown in FIG. 2E, the ball spacers 401 to 404 are disposed on the black matrixes 210 and 220 by drying the spacer ink droplets 410 and 420 (shown in FIG. 2D).

Thus, a color filter substrate and a method of fabricating the same according to an embodiment of invention employ plastic ball spacers as ball spacers. In addition, a color filter substrate and a method of fabricating the same according to an embodiment of invention have an improved accuracy in disposing ball spacers. Further, a color filter substrate and a method of fabricating the same according to an embodiment of invention prevent ball spacers from being shifted. Moreover, a color filter substrate and a method of fabricating the same according to an embodiment of invention effectively suppress touch defect, gravity defect, and light leakage defect, hereby improving the contrast ratio of a liquid crystal display device.

It will be apparent to those skilled in the art that various modifications and variations can be made in the color filter substrate for a liquid crystal display device and the method of fabricating the same of embodiments of the invention without departing from the spirit or scope of the invention. Thus, it is intended that embodiments of the invention cover the modifications and variations of this invention provided they come within the scope of the appended claims and their equivalents.

What is claimed is:

1. A color filter substrate for a liquid crystal display device, comprising:
    black matrixes on a transparent insulating substrate, the black matrixes defining pixel areas and having a first region and a second region, wherein the second region is a central portion of the black matrixes and a thickness of the black matrixes at the first region is greater than a thickness of the black matrixes at the second region;
    color filters in the pixel areas and having areas overlapping the first region of the black matrixes;
    a passivation layer on the black matrixes and the color filters; and
    ball spacers disposed only within the second region of the black matrixes, and contacted on a top surface of the passivation layer, the ball spacers being mixed with spacer ink droplets,
    wherein the black matrixes at the first region extend from the transparent insulating substrate to past a height of the top surface of the passivation layer at the second region where the ball spacers directly contact the passivation layer, whereby a thickness of the black matrixes at the first region is greater than a distance between the transparent insulating substrate and the top surface of the passivation layer at the second region.

2. The color filter substrate as claimed in claim 1, wherein the thickness of the black matrixes at the first region is about 1.5 to 4 times greater than the thickness of the black matrixes at the second region.

3. The color filter substrate as claimed in claim 1, wherein the black matrixes includes boundary regions, the boundary regions tilted at a first angle between the first and second regions.

4. The color filter substrate as claimed in claim 3, wherein the first angle of the boundary regions is between about 20° to about 160°.

5. The color filter substrate as claimed in claim 1, wherein the first region has a width about 2/30 to 6/30 times of the second region.

6. The color filter substrate as claimed in claim 1, wherein the ball spacers include plastic ball spacers.

7. The color filter substrate as claimed in claim 1, wherein the color filters include boundary regions, each of the boundary regions tilted at a second angle above the first region.

8. The color filter substrate as claimed in claim 7, wherein the second angle of the boundary regions of the color filters is between about 20° to about 160°.

9. The color filter substrate as claimed in claim 1, wherein the passivation layer is formed of polyimide.

10. The color filter substrate as claimed in claim 1, wherein the black matrixes at the first region extend from the transparent insulating substrate to past a height of the top surface of the passivation layer at the second region where the ball spacers directly contact the passivation layer by at least a thickness of the passivation layer.

11. A method for fabricating a color filter substrate, comprising:
    forming black matrixes on a transparent insulating substrate, the black matrixes defining pixel areas and having a first region and a second region, wherein the second region is a central portion of the black matrixes and a thickness of the black matrixes at the first region is greater than a thickness of the black matrixes at the second region;
    forming color filters in the pixel areas and having areas overlapping the first region of the black matrixes;
    forming a passivation layer on the black matrixes and the color filters;
    injecting spacer ink droplets mixed with ball spacers onto the black matrixes; and
    forming the ball spacers disposed only within the second region of the black matrixes, and contacted on a top surface of the passivation layer, by drying the spacer ink droplets,
    wherein the black matrixes at the first region extend from the transparent insulating substrate to past a height of the top surface of the passivation layer at the second region where the ball spacers directly contact the passivation layer, whereby a thickness of the black matrixes at the first region is greater than a distance between the transparent insulating substrate and the top surface of the passivation layer at the second region.

12. The method as claimed in claim 11, wherein the thickness of the black matrixes at the first region is about 1.5 to 4 times greater than the thickness of the black matrixes at the second region.

13. The method as claimed in claim 11, wherein the black matrixes includes boundary regions, the boundary regions formed to be tilted at a first angle between the first and second regions.

14. The method as claimed in claim 13, wherein the first angle of the boundary regions of the black matrixes is between about 20° to about 160°.

15. The method as claimed in claim 11, wherein the first region has a width about 2/30 to 6/30 times of the second region.

16. The method as claimed in claim 11, wherein the ball spacers include plastic ball spacers.

17. The method as claimed in claim 11, wherein forming the color filters including forming boundary regions in the color filters tilted at a second angle above the first region.

18. The method as claimed in claim 17, wherein the second angle of the boundary areas of the color filters is between about 20° to about 160°.

19. The method as claimed in claim 11, wherein the passivation layer is formed of polyimide.

20. The method as claimed in claim 11, wherein the black matrixes at the first region extend from the transparent insulating substrate to past a height of the top surface of the passivation layer at the second region where the ball spacers directly contact the passivation layer by at least a thickness of the passivation layer.

* * * * *